(12) United States Patent
Doveri

(10) Patent No.: US 6,715,282 B1
(45) Date of Patent: Apr. 6, 2004

(54) ACTUATOR DEVICE, IN PARTICULAR FOR OPERATING THE STAND OF MOTORCYCLES, AND AUTOMATICALLY RELEASABLE HYDRAULIC VALVE

(76) Inventor: Marco Doveri, Via XXIV Maggio, 16, I-56025 Pontedera PI (IT)

( * ) Notice: Subject to any disclaimer, the term of this patent is extended or adjusted under 35 U.S.C. 154(b) by 0 days.

(21) Appl. No.: 09/664,251

(22) Filed: Sep. 18, 2000

Related U.S. Application Data

(63) Continuation of application No. PCT/EP99/01816, filed on Mar. 18, 1999.

(30) Foreign Application Priority Data

Mar. 18, 2000 (IT) ........................................ PI98A000022

(51) Int. Cl.[7] ............................ F15B 13/042; B60S 9/10
(52) U.S. Cl. .......................... 60/474; 91/442; 280/764.1
(58) Field of Search ............................. 91/442; 60/474; 180/218; 280/301, 764.1

(56) References Cited

U.S. PATENT DOCUMENTS

| 3,136,226 | A | * | 6/1964 | Gratzmuller | .................. 91/442 |
| 3,980,150 | A | * | 9/1976 | Gigli | ........................... 280/293 |
| 4,223,906 | A | | 9/1980 | Gratza | ......................... 280/301 |
| 5,029,894 | A | * | 7/1991 | Willman | ...................... 280/301 |
| 5,118,126 | A | * | 6/1992 | Yaple | .......................... 280/293 |

FOREIGN PATENT DOCUMENTS

| DE | 2913429 | | 10/1980 | | |
| FR | 2678573 | | 1/1993 | | |
| GB | 438559 | * | 11/1935 | ................... | 60/474 |

* cited by examiner

Primary Examiner—F. Daniel Lopez
(74) Attorney, Agent, or Firm—The Bilicki Law Firm P.C.

(57) ABSTRACT

A valve and a device for actuating the rotation of a stand (4) of a motorcycle (2) comprising an hydraulic actuator (1) operating an actuating member (7) between a first and a second position bringing the stand (4) from a rest position (A) to a supporting position (B). A flow control hydraulic circuit (12–25) is provided allowing the return stroke of the actuating member (7) to the first position leaving the stand in the supporting position (B), whereby the stand can be brought to the rest position (A) independently from the actuating member (7). The device has the advantages that in case of lack of pressure in the hydraulic circuit the movement towards the rest position in which it remains is free as if the device does not exist. Moreover, it can be operated by a single drive and its encumbrance is minimal. Its installation on the vehicle, moreover, is not complex, and it does not have the drawback of the existing electromechanical systems.

10 Claims, 2 Drawing Sheets

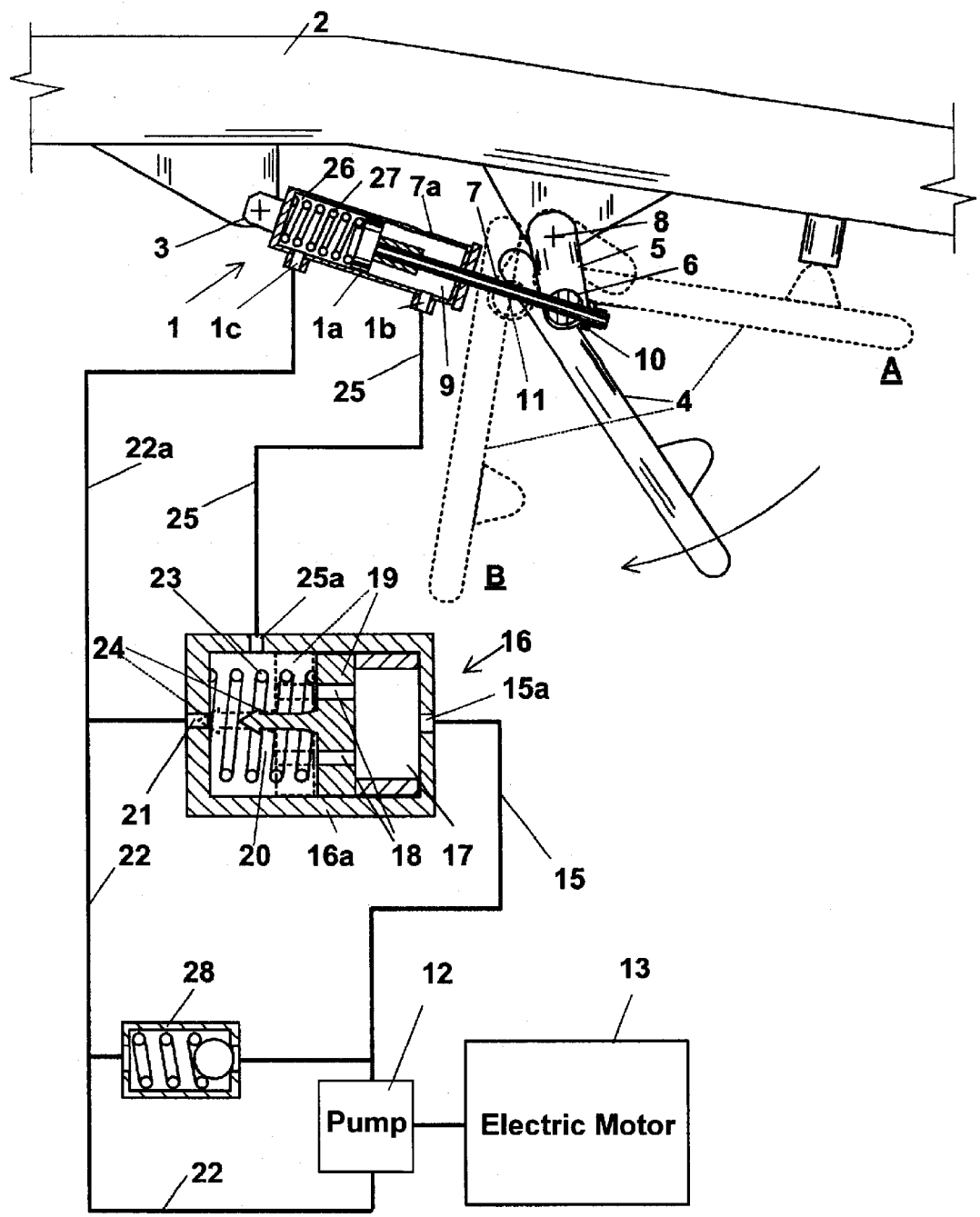

ACTUATOR DEVICE, IN PARTICULAR FOR OPERATING THE STAND OF MOTORCYCLES, AND AUTOMATICALLY RELEASABLE HYDRAULIC VALVE

The present application is a continuation of International Application No. PCT/EP99/01816, filed Mar. 18, 1999, which claims the benefit of Italian Patent Application No. IT PI98A000022, filed Mar. 18, 1998.

FIELD OF THE INVENTION

The present invention relates to the field of the motorcycles industry and more precisely it relates to an actuator device for operating the stand of motorcycles.

In particular, the invention relates to an automatically releasable hydraulic valve, used, but not exclusively, for operating motorcycles stands.

BACKGROUND OF THE INVENTION

In motorcycles and in scooters the manoeuvre of bringing the vehicle supported by the stand requires always a relevant physical force and is often troublesome. Such troubles arise the more the size and the weight of the scooter increase, and are highest with big motorcycles, whose weight without driver is even about 400 Kg. For people of small build and for some women this manoeuvre becomes in some cases impossible.

Attempts have been made in the past for actuating the stand of motorcycles by electromechanical systems. Parts mountable on existing motorcycles are known, even if not used frequently, which have, however, the drawback of being too complicated and expensive, and in which the safety problems have not been overcome sufficiently. In particular, such systems do not allow satisfactorily the release of the drive mechanism for allowing the stand to be used traditionally in case of failure of the system or in case of wrong manoeuvre by the user.

SUMMARY OF THE INVENTION

Object of the present invention is to provide a device for actuating the stand of motorcycles that can be operated electrohydraulically.

It is another object of the present invention to provide a single-acting actuator device, that operates the stand in a way that the motorcycle can be released from the stand traditionally.

It is a particular object of the invention to provide an actuator device for a motorcycle stand that has not the drawback of the known electromechanical actuators and comprises in a single unit all the functions necessary for operating the stand, as well as provides maximum safety, simple operation by the driver, stiffness, low encumbrance and easy installation on the vehicle.

It is a further object of the invention to provide a special hydraulic valve which automatically returns to a rest position as soon as the oil flow is stopped.

These and other objects are achieved by the actuator device and by the valve according to the present invention.

According to a first aspect of the invention, a device for actuating the rotation of a stand of a motorcycle, wherein the stand is pivotally connected to the motorcycle and are provided means for resiliently returning it from a standing position to a rest position, comprises at least an hydraulic actuator operating an actuating member between a first and a second position. The actuating member, when passing from the first to the second position, engages with the stand up to bringing it respectively from the rest position to the standing position. A flow control hydraulic circuit is provided that delivers liquid under pressure to the actuator for moving the actuating member from the first to the second position and allows the return stroke of the actuating member in the first position when the flow of the liquid ceases, whereby the stand can be turned to the rest position independently from the actuating member.

Advantageously, the flow control hydraulic circuit comprises a flow control valve connected with a first and a second opening of passage of liquid of the hydraulic actuator. The flow control valve comprises:

a cylinder, a piston that slides in the cylinder and divides it into a first and a second chamber, an inlet mouth of liquid under pressure into the first chamber, connected with the delivery of a pump suitable for supplying pressurised liquid, an outlet mouth of liquid from the second chamber connected with the suction duct of the pump, the second chamber having a delivery mouth connected with the first opening of the actuator, the piston has axial through holes for connecting the first and second chamber;

resilient means are provided that bias the movement of the piston to reduce the second chamber by means of the liquid flow through the holes;

the outlet mouth communicates also with the second opening of the actuator;

stopping means of the outlet mouth are provided according to the movement of the piston for reducing the second chamber, whereby the liquid flowing through the holes stops the outlet mouth causing the passage of liquid through the delivery mouth.

Preferably, the stopping means of the outlet mouth comprise a needle that extends from the piston through the second chamber. The hydraulic actuator may be an hydraulic cylinder and the actuating member may be a stem that moves between an extended position and a retracted position, the stem being in the retracted position when it is located in the second position. Alternatively the stem is in the retracted position when it is located in the first position.

In a preferred embodiment, the means for allowing the back stroke of the stem in the extended position comprises a pivot with a transversal hole and rotatably connected to the stand, the stem slidingly engaging with the hole and having an enlarged end with respect to the hole, whereby the passage of the stem from the extended position to the retracted position causes the pulling of the pivot and then the pulling of the stand from the rest position to the standing position.

The hydraulic cylinder may comprise a first and a second opening of passage of liquid for operating the movement of the stem between the extended position and the retracted position, resilient means being provided for pushing the stem to the extended position and pushing the liquid out through the first opening.

In an alternate embodiment, the actuator for moving the actuating member from the first to the second position allows the return stroke of the actuating member and the stand, the stand being pivotally connected to the actuating member whereby the actuating member returns to the extended position only when the stand returns to the rest position.

According to another aspect of the invention, an hydraulic valve associated to an hydraulic actuator is provided as above described.

BRIEF DESCRIPTION OF THE DRAWINGS

Further characteristics and the advantages of the actuator device and of the valve according to the present invention will be made clearer with the following description of an embodiment thereof, exemplifying but not limitative, with reference to attached drawings wherein:

FIG. 2 shows a diagrammatical view of the hydraulic circuit of the actuator of FIG. 1.

DESCRIPTION OF THE PREFERRED EMBODIMENTS

Figure 1:
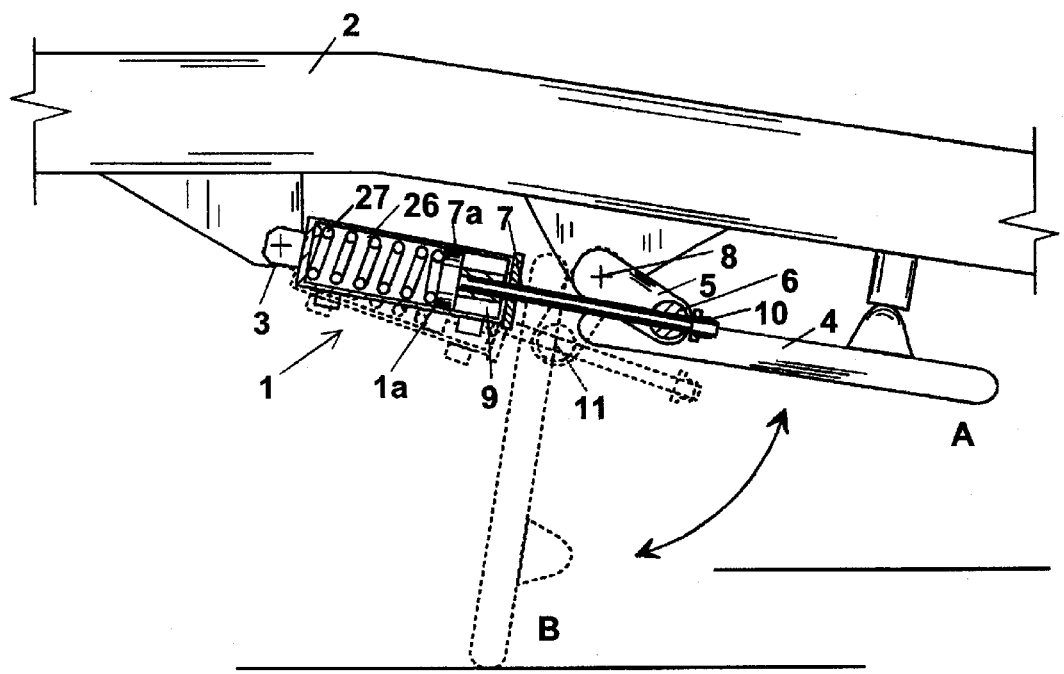
FIG. 1 is a diagrammatical example, not limitative, showing the application to a motorcycle of the actuator according to the invention.

With reference to FIG. 1, according to the present invention, to a motorcycle frame 2 an hydraulic actuator 1 is pivotally connected at 3. Actuator 1 has a stem 7 operated by a piston 7a that slides in a cylinder 1a. Piston 7a divides the cylinder 1a into two chambers, 9 and 26, and is biased by a spring 27 present in chamber 26. Chambers 9 and 26 have respectively a first and a second liquid passage mouth 1b and 1c.

Stem 7 slidingly engages with a pierced pivot 6 rotatably connected to a fork 5 hinged in 8 to frame 2. Fork 5 is integral to a stand 4, suitable for holding frame 2 of the motorcycle in a standing position when not running. Advantageously, stand 4 is shown in a diagrammatical way, being clear that it has a structure of type known to a man of the art.

Stand 4 is shown in two positions: a rest position, substantially aligned to frame 2 and indicated with a continuous line, and a position B of stay, substantially orthogonal to frame 2 and indicated with a dotted line. Spring means are provided, not shown since known in the existing stands, for returning the stand from the position B of support of the vehicle to the rest position A, and that acts on fork 5 of stand 4 biasing its rotation in a clockwise direction.

Actuator 1 has chamber 9 wherein pressurised oil is delivered through first opening 1b and has stem 7 having at the free end a pawl 10, suitable for abutting against pivot 6, because it is not capable of passing through its hole.

As shown in FIG. 2, when the delivery of pressurised oil into chamber 9 causes stem 7 to return, pawl 10 abuts against pivot 6 causing fork 5 to rotate with respect to hinge 8 as shown by the arrow, and causing thus the lowering of stand 4 up to the standing position B indicated with a dotted line both in FIG. 1 and in FIG. 2.

According to a first advantageous aspect of the invention, when stand 4 has achieved position B of FIG. 1, stem 7 returns automatically in the rest position indicated with a dotted line, whereas stand 4 continues to remain in the position B. This is achieved by the automatic emptying of chamber 9, obtained as described below.

In the diagrammatical functional view of actuator 1 of FIG. 2 a positive displacement pump 12 is shown which, operated by an electrical motor 13, delivers pressurised oil through the delivery duct 15 into a special flow control valve 16 through an inlet mouth 15a.

Valve 16 comprises a cylinder 16a having a chamber 17 and a chamber 20 separated by a piston 19 having holes 18. Chamber 20 has an outlet 21 connected with a suction duct 22 of pump 12, and a side delivery duct 25, through a mouth 25a, for delivering pressurised oil into chamber 9 of actuator 1. Piston 19 is pushed towards chamber 17 by a spring 23 and has a needle 24 suitable for engaging in outlet 21 and then stopping it.

At start of motor 13 pump 12 delivers pressurised oil into chamber 17 through duct 15. The oil, through holes 18 of piston 19, passes into chamber 20 from chamber 17 and, through hole 21, can go back to pump 12 through suction duct 22, as a by-pass. In this first transitional step, the oil does not exit from mouth 25a, since it is not capable of overcoming the load of spring 27 acting on piston 7a of actuator 1.

However, this by-pass condition ceases immediately and automatically because the loss of pressure to which the oil flow is subject when crossing holes 18 of piston 19 creates on the piston itself a force which, overcoming the reaction of spring 23, moves it towards chamber 20 so that needle 24 can stop hole 21.

The by-pass being thus interrupted, the pressurised oil is necessarily delivered through mouth 25a of chamber 20 and through duct 25 into chamber 9 of the actuator cylinder, thus pushing the piston of stem 7 towards chamber 26, compressing spring 27 and, through stem 7, as above described, displacing fork 5 of stand 4 that moves from rest position A to standing position B.

The loss of pressure of the oil flowing towards chamber 9 of actuator 1 through holes 18 of piston 19 continues to keep mouth 21 closed by means of needle 24, and the oil pressure also contributes to this by acting on the head of needle 24. Chamber 9, even if a storage reservoir is not provided, is filled completely by pressurised oil, since ducts 15, 22 and 25 contain oil enough for operating actuator 1. This is due to the fact that the oil contained in chamber 26, pushed out from piston 7a, is transferred completely from pump 12 into chamber 9. However, since the volume of oil that goes out from chamber 26 is more than that chamber 9 can receive, owing to the volume occupied by stem 7 that crosses cylinder 1a, chamber 26 is not filled completely of oil, but it contains a slight amount of air.

When motor 13 stops, either because the user observes the achievement of standing position B, or because the user wishes to interrupt the manoeuvre, the oil flow through piston 18 towards chamber 9 ceases and spring 23 returns quickly piston 19 back, freeing mouth 21 from needle 24. At the same time, spring 27 returns gradually piston 7a back and stem 7 again in the position of FIG. 1, when stand 4, already, is in steady standing position and supports vehicle 2. Contemporaneously, the oil pushed out from chamber 9 fills chamber 26, through mouth 21 and duct 22a, compressing the air present therein. In other words, a by-pass is established with chamber 26, which aspirates oil owing to spring 27, which pushes piston 7a towards the right of FIG. 2.

As already said, in order to return the stand again in rest position, which is a running position for the vehicle, it is sufficient a normal movement such as for a manual stand. Its rotation does not interfere with actuator 1, except from the fact of pivoting it about the hinge 3 between the positions indicated in FIG. 1 with respectively a dotted line and a continuous line. Furthermore, the inverse movement from A to B of the stand is not impeded as well, even if troublesome in case of heavy motorcycles, without operating the actuator 1.

Between suction duct 22 and delivery duct 15 a safety valve 28 is advantageously provided. Therefore, if after the operation the user does not leave immediately the command button and the electrical motor 13 continues to drive pump 12, the oil pressure rises up to actuating the safety valve 28, suitably adjusted to a pressure higher than the maximum pressure necessary for raising the vehicle. As soon as the user leaves the command button, instead, special valve 16 assures that stem 7 returns always in extended position, allowing a quick return of the stand to the rest position, if desired.

As it is clear from the above description, the actuator according to the invention is particularly suitable for raising the stand of a motorcycle, but this type of use is not limitative for the scope of the invention.

In particular, the actuator has the following advantages:

maximum safety, since, in case of lack of pressure of the hydraulic device, the stand is not connected to the device in its movement towards the running position, and it remains in running position held by its springs as if the device does not exist;

operation by the user with a single command, which is that of the electrical motor 13 that drives hydraulic pump 12, without electro-valves, electrical limit stop devices or other sensor devices;

its encumbrance is low, and it can be installed on many types of motorcycles;

its installation on the vehicle is very easy, being sufficient a connection with the frame and a connection with the stand, with only a few electrical connections;

it is not complex and not expensive also with respect to the existing electromechanical systems and it has not the drawback thereof.

Notwithstanding reference has been made to an actuator 1 that causes the movement of stand 4 by returning stem 7, it is obviously possible to provide in a way completely equivalent an actuator that works pushing the stem for causing the movement of the stand from position A to position B.

Moreover, notwithstanding reference has been made to an actuator 1 wherein the movement of stand 4 and of stem 7 are free with respect to one another, except from the case of when an oil flow passes from valve 16 through delivery mouth 25a, it is also possible that stem 7 is integral to pivot 6, and the operation thereof is similar to electromechanical devices. However, many advantages still arise by using valve 16 according to the invention, owing to the presence of safety valve 28.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. An actuator device for actuating rotation of a motorized vehicle stand, said stand being pivotally connected to a vehicle frame and being movable between a standing and a rest position; said actuator device comprising:

a hydraulic actuator operating an actuating member between a first position and a second position; wherein, when said actuating member moves from said first position to said second position, said actuating member engages said stand, moving said stand from said rest position to said standing position; and a flow control hydraulic circuit, comprising a flow control valve for delivering pressurized liquid to said hydraulic actuator, for moving said actuating member from said first position to said second position, and allowing a return stroke of said actuating member from said second position to said first position when delivery of liquid ceases;

wherein said stand is selectively moved to said rest position independent of said actuating member.

2. An actuator device according to claim 1, wherein said flow control valve is connected with a first port and a second port of said hydraulic actuator.

3. An actuator device according to claim 2, wherein said flow control hydraulic circuit further comprises a first delivery duct and suction duct connected to a pump; and wherein said flow control valve comprises:

a cylinder;

a piston which slides in said cylinder and divides said cylinder into a first chamber and a second chamber, wherein portions of said piston form axial through holes fluidly connecting said first chamber with said second chamber;

an inlet port in said first chamber connected to said first delivery duct, for allowing pressurized liquid to be delivered into said first chamber of said cylinder;

a first outlet port in said second chamber connected to said second port of said hydraulic actuator by said suction duct;

a second outlet port in said second chamber connected to said first port of said hydraulic actuator by a second delivery duct;

resilient means for biasing said piston such that said second chamber has a maximum size; and closing means for selectively closing said first outlet port, wherein, when said pump delivers liquid to said first chamber through said inlet port, said piston moves to decrease the size of said second chamber, causing said closing means to close said first outlet port, thereby causing liquid to be delivered through said second delivery duct to said first port of said hydraulic actuator.

4. An actuator device according to claim 3, wherein said closing means is a needle extending from said piston through said second chamber.

5. An actuator device according to any of claims 1–4, wherein said hydraulic actuator is a linear hydraulic cylinder and said actuating member is a piston rod, which is extended in said first position and is retracted in said second position.

6. An actuator device according to claim 5 further comprising, a pivot with a transverse hole and rotatably connected to said stand, wherein said piston rod has an enlarged end and slidingly engages said transverse hole; whereby movement of said piston rod from said extended position to said retracted position causes said enlarged end to engage said pivot and thereby move said stand from said rest position to said standing position.

7. An actuator device according to claim 6, wherein said hydraulic cylinder comprises a first port and a second port through which liquid flows during movement of said piston rod to an extended position.

8. An actuator device according to any of claims 1–4, wherein said hydraulic actuator is a linear hydraulic cylinder and said actuating member is a piston rod, which is extended in said second position and is retracted in said first position.

9. An actuator device according to claim 1 wherein said flow control valve delivers pressurized liquid to said hydraulic actuator only when a flow of liquid is established through said flow control valve.

10. A flow control hydraulic circuit for operating an hydraulic actuator, comprising, a pump, connected to a suction duct and a first delivery duct;

a hydraulic valve connected with a first port and a second port of said hydraulic actuator; wherein said hydraulic valve includes a cylinder;

a piston which slides in said cylinder and divides said cylinder into a first chamber and a second chamber, wherein portions of said piston forming axial through holes fluidly connect said first chamber with said second chamber;

an inlet port connected with said first delivery duct of said pump, for allowing flow of pressurized liquid into said first chamber, a first outlet port connected with said suction duct of said pump and said second port of said hydraulic actuator;

a second outlet port in said second chamber connected to said first port of said hydraulic actuator by a second delivery duct, resilient means for biasing said piston such that said second chamber is at maximum size; and closing means for selectively closing said first outlet port;

wherein when said pump delivers liquid to said first chamber through said inlet port, said piston moves to decrease the size of said second chamber, causing said closing means to close said outlet port, thereby causing flow of liquid through said second delivery duct to said first port of said hydraulic actuator.

* * * * *